(12) United States Patent
Thorn

(10) Patent No.: US 12,163,628 B2
(45) Date of Patent: Dec. 10, 2024

(54) LPG FUEL SUPPLY SYSTEM WITH VAPOR LOCK PREVENTION

(71) Applicant: ICOM North America LLC, New Hudson, MI (US)

(72) Inventor: Brandon Geoffrey Thorn, Fowlerville, MI (US)

(73) Assignee: ICOM North America LLC, New Hudson, MI (US)

( * ) Notice: Subject to any disclaimer, the term of this patent is extended or adjusted under 35 U.S.C. 154(b) by 678 days.

(21) Appl. No.: 17/436,641

(22) PCT Filed: Mar. 13, 2020

(86) PCT No.: PCT/US2020/022550
§ 371 (c)(1),
(2) Date: Sep. 6, 2021

(87) PCT Pub. No.: WO2020/186137
PCT Pub. Date: Sep. 17, 2020

(65) Prior Publication Data
US 2022/0154884 A1    May 19, 2022

Related U.S. Application Data

(60) Provisional application No. 62/817,658, filed on Mar. 13, 2019.

(51) Int. Cl.
*F17C 7/00* (2006.01)
*F02M 21/02* (2006.01)
(Continued)

(52) U.S. Cl.
CPC ........... *F17C 7/00* (2013.01); *F02M 21/0212* (2013.01); *F02M 37/0052* (2013.01); *F04B 37/02* (2013.01); *F04B 37/10* (2013.01); *F17C 2201/0109* (2013.01); *F17C 2201/035* (2013.01); *F17C 2201/056* (2013.01); *F17C 2205/0326* (2013.01);
(Continued)

(58) Field of Classification Search
CPC . F17C 7/00; F04B 37/02; F04B 37/10; F02M 37/0017; F02M 37/0023; F02M 37/0052; F02M 21/0212
See application file for complete search history.

(56) References Cited

U.S. PATENT DOCUMENTS

| | | | | |
|---|---|---|---|---|
| 6,058,713 A | * | 5/2000 | Bowen | F02M 21/0212 62/7 |
| 2001/0050167 A1 | * | 12/2001 | Buysse | B60P 3/2245 165/279 |
| 2002/0144509 A1 | * | 10/2002 | Chalk | F17C 9/02 62/50.7 |

* cited by examiner

*Primary Examiner* — Jacob M Amick
(74) *Attorney, Agent, or Firm* — Eschweiler & Potashnik,

(57) ABSTRACT

A liquid petroleum gas (LPG) fuel supply system for a vehicle having an internal combustion engine includes an LPG tank, a fuel pump housing, a fuel pump inside the fuel pump housing, a fuel supply line connected between the LPG tank and the fuel pump housing, and a vapor release port located on the fuel pump housing. The vapor release port is connected to the LPG tank by a vapor return line. The fuel pump housing fills with LPG from the LPG tank under the action of gravity. Vapor forms in the fuel pump housing, separates from the liquid, gathers toward the top of the fuel pump housing, and under the action of gravity, displaces through the vapor port, rises through the vapor return conduit, and is released into the LPG tank 19, balancing pressure and preventing vapor lock.

19 Claims, 2 Drawing Sheets

(51) Int. Cl.
    *F02M 37/00*     (2006.01)
    *F04B 37/02*     (2006.01)
    *F04B 37/10*     (2006.01)

(52) U.S. Cl.
    CPC .......................... *F17C 2205/0335* (2013.01); *F17C 2221/035* (2013.01); *F17C 2223/0153* (2013.01); *F17C 2223/033* (2013.01); *F17C 2227/0142* (2013.01); *F17C 2265/032* (2013.01); *F17C 2270/0168* (2013.01); *Y02T 10/30* (2013.01)

LPG FUEL SUPPLY SYSTEM WITH VAPOR LOCK PREVENTION

FIELD

The present teachings relate to liquified petroleum gas (LPG) fuel supply systems for use on vehicles fueled with liquid propane or the life.

BACKGROUND

An LPG fuel supply system includes an LPG tank and a fuel pump. Typically, the fuel pump is located inside the LPG Tank. A disadvantage of this approach is that the LPG tank must be completely drained before the pump can be serviced or replaced. Draining an LPG tank is a time consuming and potentially dangerous operation. Attempts have been made to utilize fuel pumps mounted outside the LPG tank, but these fuel pumps have been susceptible to vapor lock. Vapor lock takes place when heat, such as heat generated from operating the fuel pump, causes the LPG vapor pressure in the fuel pump to increase to a point where the pressure prevents the fuel pump from drawing more liquid from the LPG tank. Vapor displaces liquid within the fuel pump, causing the fuel pump to fail. One solution is to house the fuel pump in a chamber within the LPG tank that can be isolated from the rest of the LPG tank when the pump needs to be serviced or replaced.

SUMMARY

The present teachings relate to a liquid petroleum gas (LPG) fuel supply system for a vehicle having an internal combustion engine. The LPG fuel supply system includes an LPG tank, a fuel pump housing, a fuel pump inside the fuel pump housing, a fuel supply line connected between the LPG tank and the fuel pump housing, and a vapor release port located on the fuel pump housing. The vapor release port is connected to the LPG tank by a vapor return line. In some of these teaching the fuel pump is located at or below the level of the bottom of the fuel tank. In some of these teachings, the vapor release port is at the top of the housing. In some of these teachings, the vapor return line communicates with a vapor space of the LPG tank. Vapor that forms in the fuel pump housing travels through the vapor return line and is released into the vapor space of the LPG tank, balancing the pressure in the LPG tank with the pressure in the fuel pump housing and thereby preventing vapor lock. The LPG tank may be a standard LPG tank with only standard fittings.

In some of these teachings, the vapor return line connects with a port in a lower portion of the LPG tank. This approach may reduce pressure in the vapor return line. In some of these teachings, the LPG tank has a bottom baffle with a first side facing an intake port for the fuel supply line and a second side facing away from the intake port. In some of these teachings, the vapor return line connects with a port on the opposite side of the baffle from the intake port. In this configuration, the vapor return line may have a lower pressure head than one connected directly to the vapor space.

Some aspects of the present teachings relate to an LPG fuel pump system that includes a fuel pump inside a housing, a supply line for connecting the fuel pump to an LPG fuel tank, a vapor release port located on the housing, and a vapor return line for connecting the vapor release port to the LPG tank. In some of these teachings, the vapor release port is located at the top of the housing. In some of these teachings, the fuel pump has a fuel pump outlet and the housing has a fuel outlet and the fuel outlet of the housing is higher than the fuel pump outlet.

Some aspects of the present teaching relate to a method of retrofitting a vehicle with a gasoline or diesel engine to run off liquid petroleum gas. The method includes attaching an LPG tank and an LPG fuel pump to the vehicle, wherein the LPG fuel pump is contained in a housing external to the LPG tank. The LPG tank and the housing are connected with a fuel supply line. A vapor port in the housing is connected to the LPG tan with a vapor return line. Vapor in the housing is allowed to return to the LPG tank through the action of gravity. In some of these teachings, the LPG fuel pump is attached to the vehicle to be level with or below a bottom of the LPG tank. In some of these teachings, the vapor return line connects to the LPG tank through a port form in a bottom third of the LPG tank.

The primary purpose of this summary has been to present broad aspects of the present teachings in a simplified form to facilitate understanding of the present disclosure. This summary is not a comprehensive description of every aspect of the present teachings. Other aspects of the present teachings will be conveyed to one of ordinary skill in the art by the following detailed description together with the drawings.

DETAILED DESCRIPTION

Figure 1:
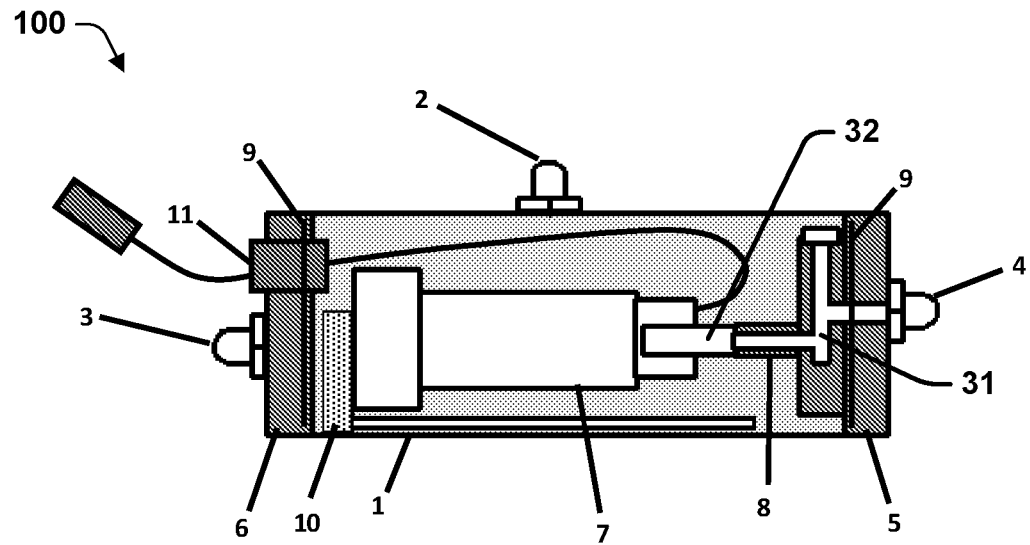
FIG. 1 illustrates a fuel pump system according to some aspects of the present teachings.

FIG. illustrates a fuel pump system 100 according to some aspects of the present teachings. Fuel pump system 100 includes a housing 1 that contains a pumping device 7. Housing 1 may have two end caps, an inlet end cap 6 and an outlet end cap 5. Inlet end cap 6 may be sealed utilizing an O-ring 9 and may include a liquid port 3 and a sealed wiring pass-thru 11 for powering the pumping device 7. Outlet end cap 5 may be sealed with another O-ring 9 and include an internal mounting 8 for pumping device 7 and an outlet fitting 4 for supplying an engine with LPG. A vapor port 2 is installed at the top of housing 1.

Fuel enters housing 1 through liquid port 3. Pumping device 7 draws fuel from inside housing 1 through filter 10. Pumping device 7 expels fuel through outlet fitting 4. Fuel vapor forming in housing 1 rises to the top of housing 1 and is released through vapor port 2. Internal mounting 8 holds pumping device 7 near the bottom of housing 1. Conduits 31 formed within internal mounting 8 guide fuel from an outlet 32 of pumping device 7 to outlet fitting 4. Pumping device 7 may be any type of device that is suitable for pumping LPG fuel. Pumping device 7 may be, for example, a positive displacement pump or kinetic pump. A suitable positive displacement pump may be a reciprocating pump or a rotary pump.

Figure 2:
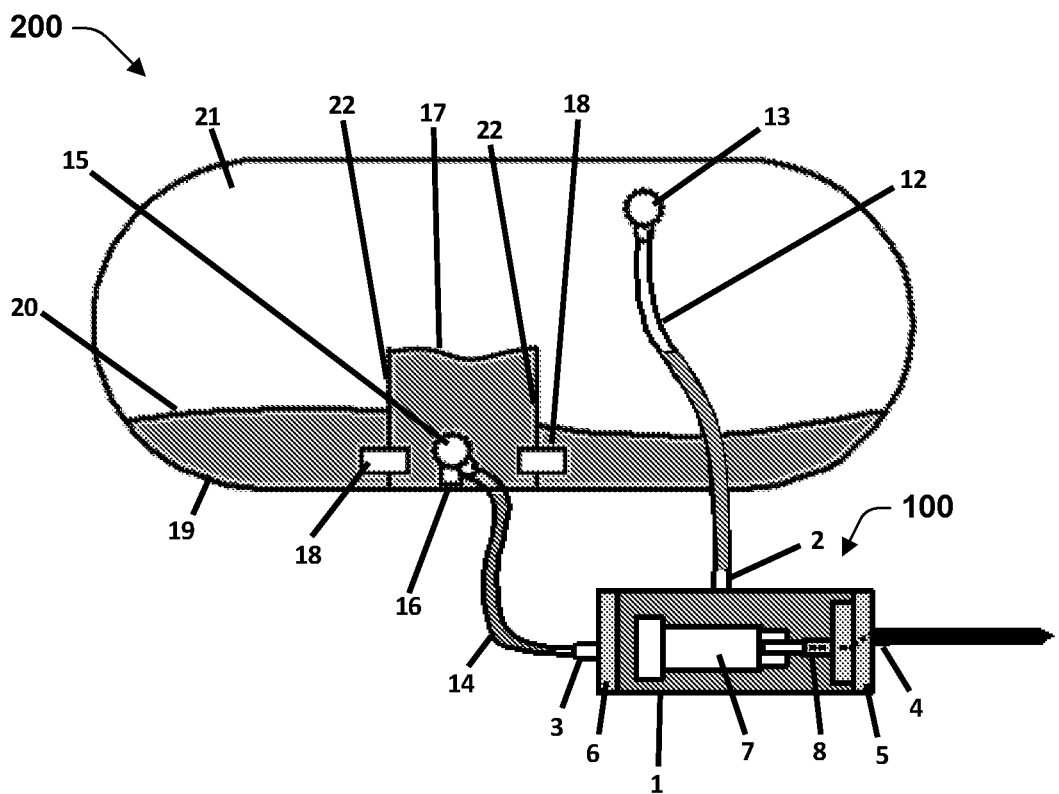
FIG. 2 illustrates a fuel supply system according to some aspects of the present teachings.

FIG. 2 illustrates an LPG fuel supply system 200 according to some aspects of the present teachings. LPG fuel supply system 200 includes fuel pump system 100 and LPG tank 19. LPG tank 19 has two fittings for communicating with fuel pump system 100, a liquid supply fitting 15 and a vapor return fitting 13. In this example, vapor return fitting 13 opens onto a vapor space 21 in the upper third of LPG tank 19. Vapor return fitting 13 may open onto a location in the top 15% of LPG tank 19 to ensure continuous communication with vapor space 21. A liquid supply conduit 14 connects between liquid supply fitting 15 and liquid port 3 on housing 1. A vapor return conduit 12 connects between vapor return fitting 13 and vapor port 2 on housing 1. Liquid supply fitting 15, vapor return fitting 13, liquid port 3, and vapor port 2 may have tapered pipe threads and may all be standard fittings of the type referred to as "NPT fittings". LPG tank 19 may include shut-off valves at the locations of liquid supply fitting 15 and vapor return fitting 13. Liquid supply conduit 14 and vapor return conduit 12 may be hoses.

LPG tank 19 includes two baffles 22 that mate with the bottom of LPG tank 19. Check valves 18 are installed in baffles 22 allowing fuel to flow toward a tank area that contains liquid supply fitting 15, but not in the other direction. As LPG tank 19 is moved about, check valves 18 cause a flow of fuel that make liquid level 17 within baffles 22 higher than liquid level 20 outside baffles 22. A coupling pipe 16 allows liquid supply fitting 15 to pick up fuel from the bottom of the LPG Tank 19.

LPG tank 19 may be used with any suitable fuel. While LPG fuel is typically mostly propane, LPG fuel supply system 200 may be used with any fuel that has a vapor pressure between 1 and 100 atmospheres at 25° C.

In some of these teachings, housing 1 become completely flooded with LPG fuel. This provides the most compact design and reliably keeps filter 10 fully immersed in LPG fuel. In some others of these teachings, housing 1 includes a vapor space that does not communicate with vapor port 2 when housing 1 is flooded with fuel. The vapor space can be provided by locating vapor port 2 a distance below the top of housing 1. Providing this vapor space accommodates thermal expansion of LPG fuel within housing 1, which may be desirable in instances where housing 1 is isolated from LPG tank 19 by closing shutoff valves.

Housing 1 is small compared to LPG tank 19. In some of these teachings, LPG tank 19 has a volume ten or more times greater than housing 1. The volume of housing 1 may be 4 liters or less and is preferably 2 liters or less. LPG tank 19, one the other hand, is typically at least 10 gallons. LPG tank 19 may provide vapor space for housing 1. In some of these teachings, vapor port 2 is below a liquid level in LPG tank 19. In some of these teachings, the top of housing 1 is at or below one third the height of LPG tank 19. Housing 1 is fed from LPG In operation, housing 1 may be allowed to fill with LPG from LPG tank 19 under the action of gravity. Vapor may form in housing 1. This vapor is particularly likely to form when pumping device 7 is being operated and producing heat. The vapor separates from the liquid in housing 1 and gathers toward the top of housing 1. Under the action of gravity, this vapor displaces through vapor port 2, rises through vapor return conduit 12, and is released into vapor space 21 of LPG tank 19. A vertical spacing between vapor port 2 and liquid port 3 causes the vapor to return to LPG tank 19 through vapor return conduit 12 rather than liquid supply conduit 14. In some of these teachings, liquid port 3 is located in the lower half of inlet end cap 6. In some of these teachings, the vertical spacing between liquid port 3 and vapor port 2 is half or more the height of housing 1. In some of these teachings, the vertical spacing between liquid port 3 and vapor port 2 is more than half the height of housing 1. These structures facilitate directing vapor toward vapor port 2 rather than liquid port 3.

Vapor return fitting 13 may be installed in an upper portion of LPG tank 19 whereby the vapor from vapor return conduit 12 is released directly into vapor space 21 of LPG tank 19. In accordance with safety regulations, LPG tank 19 is never filled complete to eliminate vapor space 21. Accordingly, locating vapor return fitting 13 sufficiently high on LPG tank 19 assures that vapor return conduit 12 communicates directly with a vapor space 21.

As shown in FIG. 2, when vapor production is low a level of liquid in vapor return conduit 12 is approximately at liquid level 17, the level of liquid within baffles 22. Accordingly, vapor forming in housing 1 bubbles through liquid to reach vapor space 21 even though vapor return conduit 12 is located outside LPG tank 19. In some embodiments, vapor return fitting 13 and vapor port 2 are located below a liquid level in LPG tank 19 and returning vapor is allowed to bubble up through the liquid in LPG tank 19. In some embodiments, vapor return fitting 13 is located near the bottom of LPG tank 19. This configuration may allow the use of a shorter vapor return conduit 12 and a more compact installation. Vapor bubbling through liquid in LPG tank 19 may not encounter any more resistance than vapor bubbling through liquid in vapor return conduit 12.

Figure 3:
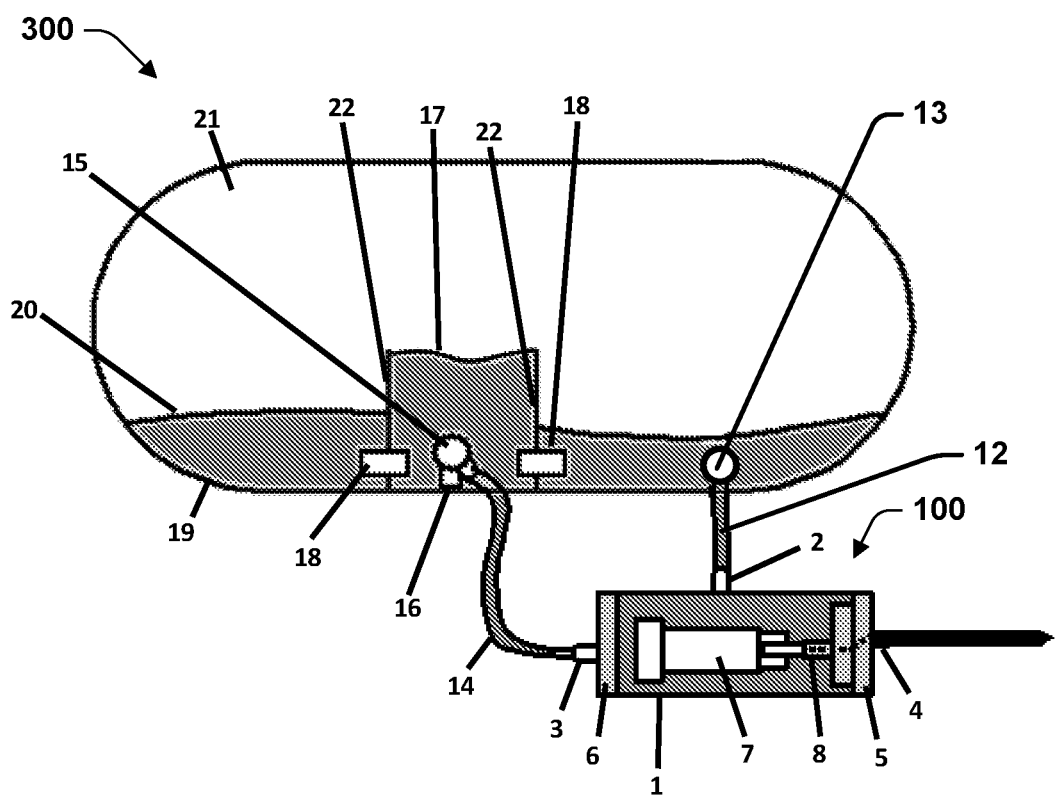
FIG. 3 illustrates a fuel supply system according to some other aspects of the present teachings.

As shown in FIG. 3, in some embodiments vapor return fitting 13 is located near the bottom of LPG tank 19 on the opposite side of a baffle 22 from coupling pipe 16. In this area, any difference in height between liquid level 17 and liquid level 20 creates a pressure head that drives a flow of liquid from LPG tank 19 to housing 1 through liquid supply conduit 14 and a return flow of liquid and vapor from housing 1 to LPG tank 19 through vapor return conduit 12. This flow may cool pumping device 7 and may help keep housing 1 free of excess vapor.

The components and features of the present disclosure have been shown and/or described in terms of certain teachings and examples. While a particular component or feature, or a broad or narrow formulation of that component or feature, may have been described in relation to only some aspects of the present teachings or some examples, all components and features in either their broad or narrow formulations may be combined with other components or features to the extent such combinations would be recognized as logical by one of ordinary skill in the art.

The invention claimed is:

1. A liquid petroleum gas (LPG) fuel supply system, comprising: an LPG tank; a fuel pump housing; a fuel pumping device inside the fuel pump housing; a fuel supply line connected between the LPG tank and the fuel pump housing; a vapor release port disposed on the fuel pump housing; and a vapor return line connecting between the vapor release port and the LPG tank.

2. The LPG fuel supply system of claim 1, wherein: the LPG tank has a bottom; and the fuel pumping device is located at or below a level of the bottom of the LPG tank.

3. The LPG fuel supply system of claim 1, wherein: the fuel pump housing has a top; and the vapor release port is located at the top of the fuel pump housing.

4. The LPG fuel supply system of claim 1, wherein: the vapor return line communicates with a vapor return port formed in the LPG tank; and the vapor return port is in an upper third of the LPG tank.

5. The LPG fuel supply system of claim 1, further comprising: the vapor return line communicates with a vapor return port formed in the LPG tank; and the vapor return port is in a lower third of the LPG tank.

6. The LPG fuel supply system of claim 5, wherein the vapor return port is located at a bottom of the LPG tank.

7. The LPG fuel supply system of claim 1, wherein the vapor return line follows a path that is continuously level or rising from the vapor release port to a point where the vapor return line connects to the LPG tank.

8. The LPG fuel supply system of claim 1, further comprising: a fuel intake system within the LPG tank, wherein the fuel intake system has an intake port within the LPG tank and an outlet coupled to the fuel supply line; wherein the fuel pumping device is below a level of the intake port.

9. The LPG fuel supply system of claim 8, further comprising: a baffle at a bottom of the LPG tank, wherein the baffle has a first side facing the intake port and a second side facing away from the intake port; and a check valve in the baffle, wherein the check valve is oriented to allow flow from second side of the baffle to the first side of the baffle.

10. The LPG fuel supply system of claim 9, wherein the vapor return line connects to the LPG tank below a level of the baffle.

11. The LPG fuel supply system of claim 10, wherein the vapor return line connects to the LPG tank in an area to the second side of the baffle.

12. The LPG fuel supply system of claim 1, wherein the LPG tank does not have openings greater than 1" in diameter.

13. A motor vehicle comprising the LPG fuel supply system of claim 1.

14. A method of retrofitting a vehicle with a gasoline or diesel engine to run off liquid petroleum gas (LPG), the method comprising: attaching an LPG tank and an LPG fuel pump to the vehicle, wherein the LPG fuel pump is contained in a housing external to the LPG tank; connecting the LPG tank and the housing with an LPG fuel supply line; and connecting a vapor port in the housing to the LPG tank with a vapor return line.

15. The method of claim 14, wherein the LPG fuel pump is attached to the vehicle to be level with or below a bottom of the LPG tank.

16. The method of claim 14, wherein the vapor return line connects to the LPG tank through a port formed in a bottom third of the LPG tank.

17. The method of claim 14, further comprising: forming a threaded opening in the LPG tank; and installing a fitting in the threaded opening; wherein the vapor return line connects to the fitting.

18. A method of operating an LPG fuel supply system, the method comprising: providing a supply conduit through which gravity fills a pump housing with liquid from an LPG tank; proving a return conduit that allows gravity to return vapor separating from the liquid within the pump housing to the LPG; and operating a pump within the pump housing to supply an engine with the liquid;
    wherein the pump housing contains a vapor space that does not communicate with the return conduit when the pump housing is flooded with the liquid.

19. The method of claim 18, further comprising allowing the pump housing to fill with the liquid.

\* \* \* \* \*